Nov. 1, 1932.  J. P. SCANNELL  1,886,053
AUTOGRAPHIC FILM CARTRIDGE
Filed Feb. 24, 1930
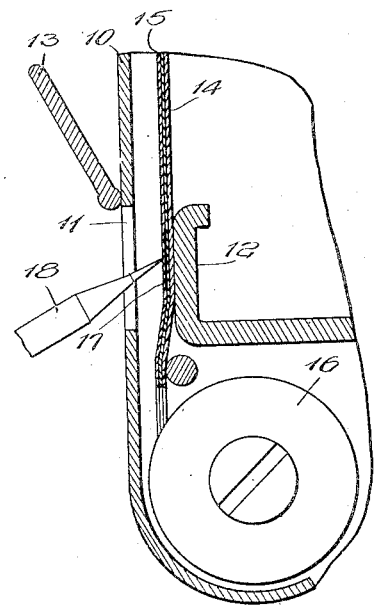
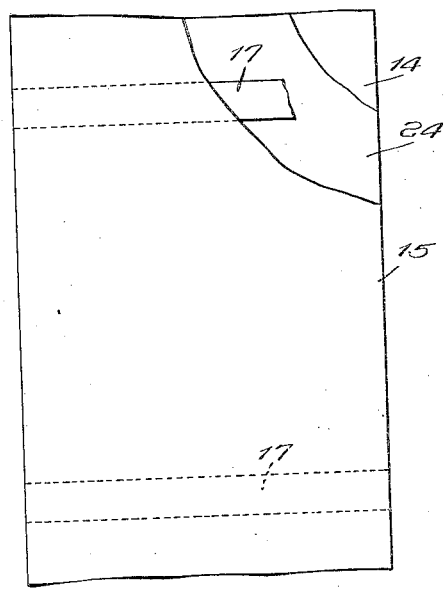
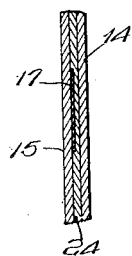
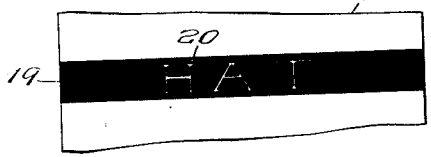
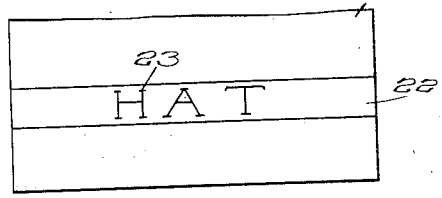
Inventor:
John P. Scannell
Witness:
William G. Kilroy Patented Nov. 1, 1932

1,886,053

UNITED STATES PATENT OFFICE

JOHN P. SCANNELL, OF OAK PARK, ILLINOIS, ASSIGNOR TO EDWARD E. EMMERICH, OF CHICAGO, ILLINOIS

AUTOGRAPHIC FILM CARTRIDGE

Application filed February 24, 1930. Serial No. 430,488.

This invention relates to the autographing of photographic films and has for its object the accomplishment thereof by the use of radiated actinic rays.

The present invention contemplates the use of a radio-responsive ray emitting substance for the autographing of photographic films in such manner that the film is at all times protected from the radio-responsive ray-emitting substance, except at the point where it is designed to operate upon and affect the film.

With the above and other objects in view, as will be apparent, this invention consists in the construction, combination and arrangement of parts, all as hereinafter more fully described, claimed and illustrated in the accompanying drawing wherein:

Fig. 1 is a fragmentary vertical section through one end of a camera, transversely through the autographic opening in the case thereof, illustrating the positions of the various elements during the autographic operation;

Fig. 2 is an enlarged longitudinal section taken through the film embodying the present invention;

Fig. 3 is an elevation of a fragment of the present film, parts thereof being broken away;

Fig. 4 is an elevation of a fragment of a negative film illustrating the autograph thereon; and Fig. 5 is an elevation of a fragment of positive print with the autograph thereon.

The present invention contemplates the production of an autograph upon a positive print in relatively dark characters upon a relatively light field and proposes to accomplish this by the use of a radio-responsive ray-emitting substance coacting with the negative film to create a photograph of the desired autograph thereon in relatively light characters upon a relatively dark field. With this end in view the normal opaque paper backing of a roll film is replaced by a relatively thin or translucent white paper backing, or a paper backing through which the actinic rays may pass. The inner face of this paper backing, that is the face adjoining the non-sensitive face of the film, is provided with a transverse panel of radio-responsive ray-emitting material or substance, such, for instance, as phosphorescent calcium sulphide. After this the entire inner face of the paper backing, including the aforesaid panel, is coated with an opaque or light obstructing compound, such as lamp black mixed with gelatin or any other suitable material. Thus the paper backing and the opaque coating is at all times between the film and the strips of radio-responsive ray-emitting material or substance on the inner face of the paper backing.

The radio-responsive ray-emitting material ordinarily does not become radio-active until it is exposed to light, hence it does not in any manner affect the film prior to the exposure thereof. It may also be pointed out that usually the application of heat to the radio-responsive, ray-emitting material will effectively render it inactive till again exposed to light. After the exposure of the film the autograph may be written in substantially light obstructing characters upon the outer surface of the paper back at the point where the radio-responsive ray-emitting material is located. As the film is wound upon the take-up spool this radio-responsive, ray-emitting strip being so positioned upon the paper back, will be located at or against the sensitized face of the autograph panel of the film, which is known as the space between exposures. When the radio-responsive, ray-emitting panel is thus positioned it will affect the sensitized face of the film except as to those portions of the panel that are covered by the substantially light obstructing characters in which the autograph is written. Thus a relatively dark field surrounding relatively light characters is created upon the negative film, by the rays emitted by the panel acting through the back and consequently, when reproduced will create an autograph in relatively dark characters surrounded by a relatively light field.

Reference being had more particularly to the drawing, 10 designates a camera case having an autograph opening 11 therein. An autographing table 12 is positioned within the camera directly opposite to the opening 11 which is designed to be closed by the gate 13. The film 14 and its paper back 15 pass to the take-up spool 16 from the feed spool (not shown) and in so doing pass between the back wall of the camera case 10, pierced by the opening 11 and the table 12. Thus, as the film 14 and its paper back 15 pass from the spool 16 to the take-up spool, the paper back 15 thereof faces the autographing opening 11 while the film 14 faces the table 12.

The construction of the film roll contemplates a back 15 of paper which may be white or any other color that will permit the passage of the actinic rays through said back. At intervals on the inner face of this paper back 15 are placed transverse panels 17 of a radio-responsive ray-emitting compound or substance such as phosphorescent calcium sulphide or its equivalent. One panel 17 is provided for each exposure of the film 14 and the back 15 may be provided with a surface indication (not shown) which may be observed through the opening 11 to indicate that the corresponding panel 17 is in position to receive the autograph. After an exposure is made on the body of the film 14, the spools are adjusted, if necessary, to bring the appropriate panel 17 into alignment with the opening 11. The gate 13 may then be opened and the light admitted through the opening 11 will immediately render the panel 17 positioned opposite the opening 11 ray-emitting. The inscription may be written in substantially light obstructing characters either with pencil or ink through the autographing opening 11 upon the outer face of the paper back 15 located over the surface of the panel 17, the table 12 acting as a support during the writing operation. As the film is wound upon the take-up spool, the autographing panel 17 is so positioned on the paper back 15 that it will be located opposite to and in cooperation with the autographing space or space between exposures of the film. In this position the rays emitted by the panel 17 acting through the back 15 will affect the entire sensitized autographic panel of the film to produce a dark field surrounding characters corresponding to such portions of the panel 17 as are covered by the light obstructing characters of the autograph. Hence, as illustrated in Fig. 4 there is a relatively dark background 19 created by the rays emitted by the panel 17 surrounding light characters 20. In the final print 21, illustrated in Fig. 5 and reproduced from the negative shown in Fig. 4 the autograph panel 22 is relatively light having relatively dark characters 23 therein.

To protect the film from any direct contact with the radio-responsive ray-emitting panels 17 and from light passing through the back 15 at all other points, the entire inner face of the paper back 15, including the panels 17 is covered with an opaque or light obstructing coating 24, of any suitable substance or compound. It has been found that lamp black mixed with gelatin containing some glycerine is one such compound or substance. This coating 24 not only coacts with the back 15 to completely separate the panels 17 from the film 14 but it also effectively prevents any light from passing inwardly through the back 15 to act on the film and confines the rays emitted by the panels 17 to and through the adjoining portions of the back 15.

From the foregoing it is manifest that a method and apparatus for autographing photographic films is herein provided utilizing light as a means of creating the autograph on the negative but which protects the film wholly and entirely from contact with the source of light except as to such points where the source of light creates the autograph.

What is claimed is:

1. An autographic film comprising a film, a light transmitting back therefor, spaced ray-emitting panels arranged transversely of said back on the face thereof, adjoining the film, and a light obstructing coating on the inner face of said back forming a permanent part thereof and covering said panels.

2. An autographic film comprising a film, an actinic ray transmitting back therefor, spaced radio-responsive ray-emitting panels arranged transversely across the face of said back adjoining the film, and an actinic ray obstructing coating on the inner face of said back forming a permanent part of the back.

3. An autographic film comprising a film, a relatively transparent back therefor, spaced panels arranged transversely on the inner face of said back containing phosphorescent calcium sulphide to radiate actinic rays through said back, and a coating of opaque material covering the entire inner face of said back including the panels aforesaid to render the back incapable of light transmission.

4. An autographic film consisting of a film, a back having light transmission properties, a transverse panel on the inner face of said back capable of radiating actinic rays outwardly through said back to affect the sensitized surface of the film when positioned adjoining the same, and a light obstructing coating extending over the entire inner face of the back including the panel aforesaid.

5. A photographic film including a back capable of transmitting light, an actinic ray emitting panel to radiate light through said back, and means for confining such radiation of said panel to and through said back.

6. A photographic film in combination with a back capable of transmitting light, of an actinic ray emitting coating on the inner face of said back, and means for directing the rays from said panel exclusively through said back.

7. A photographic film in combination with a back capable of transmitting light, of an actinic ray emitting coating on the inner face of said back, and means for directing the rays from said panel exclusively through said back and completely obstructing the passage of light through said back at all other points.

8. A photographic film in combination with a back capable of transmitting light, of an actinic ray emitting panel on the inner face of said back, and a light obstructing coating covering the inner face of said back and panel to direct the rays from said panel exclusively through said back and obstructing the transmission of light through said back at all other points.

JOHN P. SCANNELL.